(12) United States Patent
Rumer

(10) Patent No.: US 6,999,450 B2
(45) Date of Patent: Feb. 14, 2006

(54) ETHERNET BASED TDM SWITCH

(75) Inventor: Mark Rumer, Santa Barbara, CA (US)

(73) Assignee: Occam Networks, Santa Barbara, CA (US)

( * ) Notice: Subject to any disclaimer, the term of this patent is extended or adjusted under 35 U.S.C. 154(b) by 0 days.

(21) Appl. No.: 09/842,559

(22) Filed: Apr. 25, 2001

(65) Prior Publication Data

US 2002/0159438 A1    Oct. 31, 2002

(51) Int. Cl.
*H04L 12/56*  (2006.01)
(52) U.S. Cl. .................. 370/356; 370/466; 370/474
(58) Field of Classification Search ............... 370/466, 370/474, 476, 445, 401, 356
See application file for complete search history.

(56) References Cited

U.S. PATENT DOCUMENTS

| | | | | |
|---|---|---|---|---|
| 5,521,924 A | * | 5/1996 | Kakuma et al. | 370/466 |
| 5,553,071 A | * | 9/1996 | Aranguren et al. | 370/433 |
| 5,805,588 A | * | 9/1998 | Petersen | 370/356 |
| 5,892,768 A | * | 4/1999 | Jeng | 370/445 |
| 5,991,817 A | * | 11/1999 | Rowett et al. | 709/250 |
| 6,175,562 B1 | * | 1/2001 | Cave | 370/352 |
| 6,208,658 B1 | * | 3/2001 | Pickett | 370/401 |
| 6,215,789 B1 | * | 4/2001 | Keenan et al. | 370/399 |
| 6,249,528 B1 | * | 6/2001 | Kothary | 370/466 |
| 6,304,567 B1 | * | 10/2001 | Rosenberg | 370/356 |
| 6,366,583 B1 | * | 4/2002 | Rowett et al. | 370/401 |
| 6,477,164 B1 | * | 11/2002 | Vargo et al. | 370/356 |
| 6,570,890 B1 | * | 5/2003 | Keenan et al. | 370/493 |
| 6,577,631 B1 | * | 6/2003 | Keenan et al. | 370/394 |
| 6,628,657 B1 | * | 9/2003 | Manchester et al. | 370/395.1 |
| 6,639,912 B1 | * | 10/2003 | Christie et al. | 370/352 |

OTHER PUBLICATIONS

PCT Search Report PCT/US02-12213; dated Jul. 18, 2002.

* cited by examiner

*Primary Examiner*—Min Jung
(74) *Attorney, Agent, or Firm*—Blakely, Sokoloff, Taylor & Zafman LLP

(57) ABSTRACT

A method and apparatus for packetizing data framed as a TDM stream as an Ethernet packet. In an embodiment, the data is packetized into an Ethernet frame having a header which includes information which indicates an appropriate time at which to write the data into an outbound TDM stream.

1 Claim, 6 Drawing Sheets

ETHERNET BASED TDM SWITCH

FIELD OF THE INVENTION

This invention relates generally to switches, and more particularly to switching data framed as a Time Division Multiplexing stream over an Ethernet backplane.

BACKGROUND

Data communication in a computer network involves the exchange of data between two or more entities interconnected by communication links and subnetworks. These entities are typically software programs executing on hardware computer platforms, such as end stations and intermediate stations. The stations typically communicate by exchanging discrete packets or frames of data according to predefined protocols. In this context, a protocol consists of a set of rules defining how the stations interact with each other.

A switch is one example of an intermediate station which interconnects the communication links and subnetworks to enable transmission of data between the end stations. A switch functions as an interchange and provides path switching for data being transported over a network. Typically, a switch supports one network protocol (e.g. Ethernet), meaning that the switch manages data in a particular format. Data in an Ethernet format will include a header, which specifies the destination and source of the data being transported. A switch having an Ethernet backplane (i.e. configured to handle Ethernet data traffic) routes the data to a location specified in the Ethernet header. This works well if all of the data follows the protocol of the switch. However, problems arise if data is not presented in the proper format.

For example, some data is sent in a Time Division Multiplexing ("TDM") stream, meaning that multiple data streams have been combined into one data stream (FIG. 6). A TDM stream, by itself, is not compatible with an Ethernet switch, which transports Ethernet frames across the backplane. Ordinarily, separate TDM-compatible hardware is needed to transport TDM data streams. Thus, at least two system infrastructures would be needed.

SUMMARY

A method and apparatus for packetizing data framed as a TDM stream as an Ethernet packet are disclosed. In an embodiment, the data is packetized into an Ethernet frame having a header which includes information which indicates an appropriate time at which to write the data into an outbound TDM stream.

DESCRIPTION OF THE DRAWINGS

The features, aspects, and advantages of the present invention will become more fully apparent from the following Detailed Description and appended claims when taken in conjunction with the accompanying drawings in which:

DETAILED DESCRIPTION

The present invention overcomes the problems in the existing art described above by eliminating the need for multiple communication fabrics when switching TDM data traffic over an Ethernet-based system. In the following description, for the purposes of explanation, numerous specific details are set forth in order to provide a thorough understanding of the present invention. It will be apparent, however, to one skilled in the art that the present invention may be practiced without some of these specific details. The following description and accompanying drawings provide various examples for the purposes of illustration. However, these examples should not be construed in a limiting sense as they are merely intended to provide examples of the present invention rather than to provide an exhaustive list of all possible implementations of the present invention.

Figure 1:
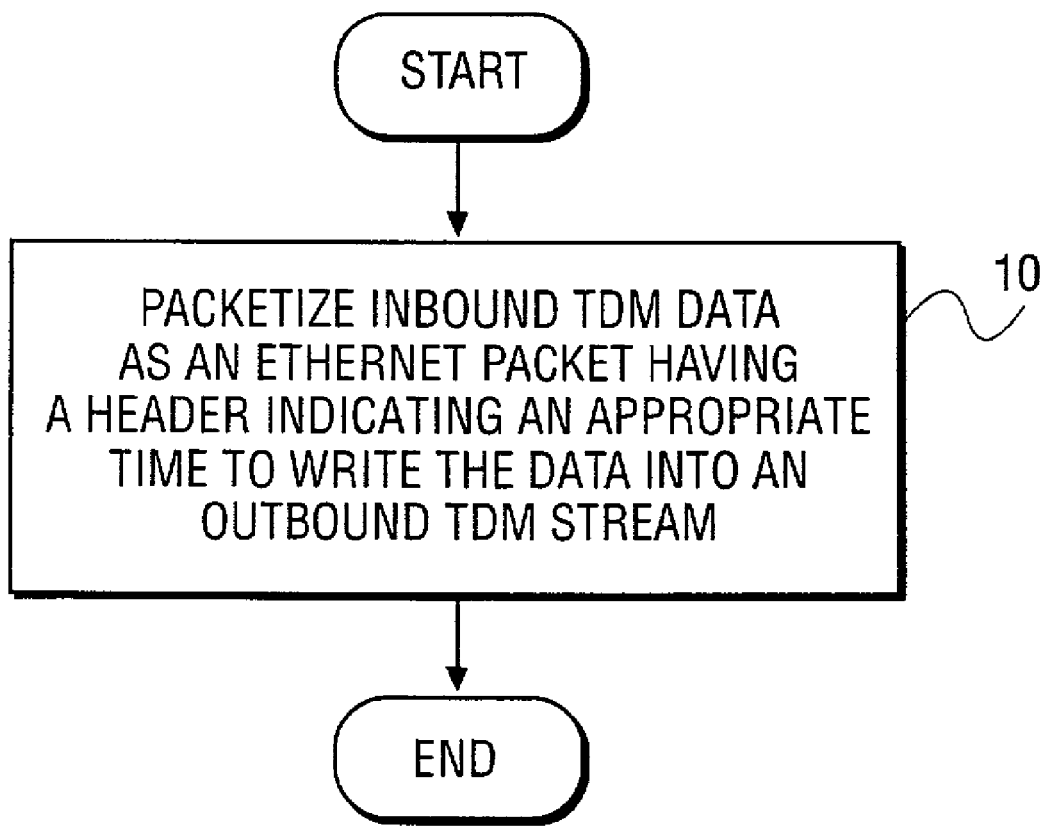
FIG. 1 is a flow chart of a method of packetizing TDM data as an Ethernet packet.

Turning now to FIG. 1, a method according to the present invention is shown. The method comprises a packetizing step 10, in which an inbound TDM data stream is framed as an Ethernet packet having a header which includes information which indicates an appropriate time at which to write the TDM data into an outbound TDM stream. Among other applications, this packetizing step 10 allows for switching data framed as a TDM stream over an Ethernet backplane and eliminates the need for separate communications fabrics (e.g. one fabric for TDM data traffic and one for Ethernet traffic). In an embodiment, the packetizing step 10 can include writing a TDM frame into a first field in the Ethernet frame (e.g. the payload field) and writing information which indicates an appropriate time to insert the data into an outbound TDM stream into a second field in the Ethernet frame (e.g. the destination field). Among others, the information which indicates an appropriate time to insert the data into an outbound TDM stream could be (1) the destination of the TDM data, or (2) information identifying which block of the TDM stream the data came from in order to reassemble the data correctly in an outgoing TDM stream, or (3) both the destination information and the identifying information.

In an embodiment not shown, the packetizing step 10 of FIG. 1 can include double buffering the TDM data. For example, the inbound TDM data stream is written to a first buffer. The inbound TDM data stream is then written to a second buffer while the TDM data previously stored in the first buffer is written into an Ethernet packet.

It is worth noting that the amount of TDM data included in each Ethernet frame can be varied. As the amount of TDM data per Ethernet frame increases, so does the latency associated with buffering, packetizing, transporting, extracting, and reassembling the TDM data. As the amount of TDM data per Ethernet frame decreases, so does the speed at which the TDM data can be transported and reassembled for the outbound TDM stream. Thus, the optimal amount of TDM data included in each Ethernet frame will vary.

Figure 2:
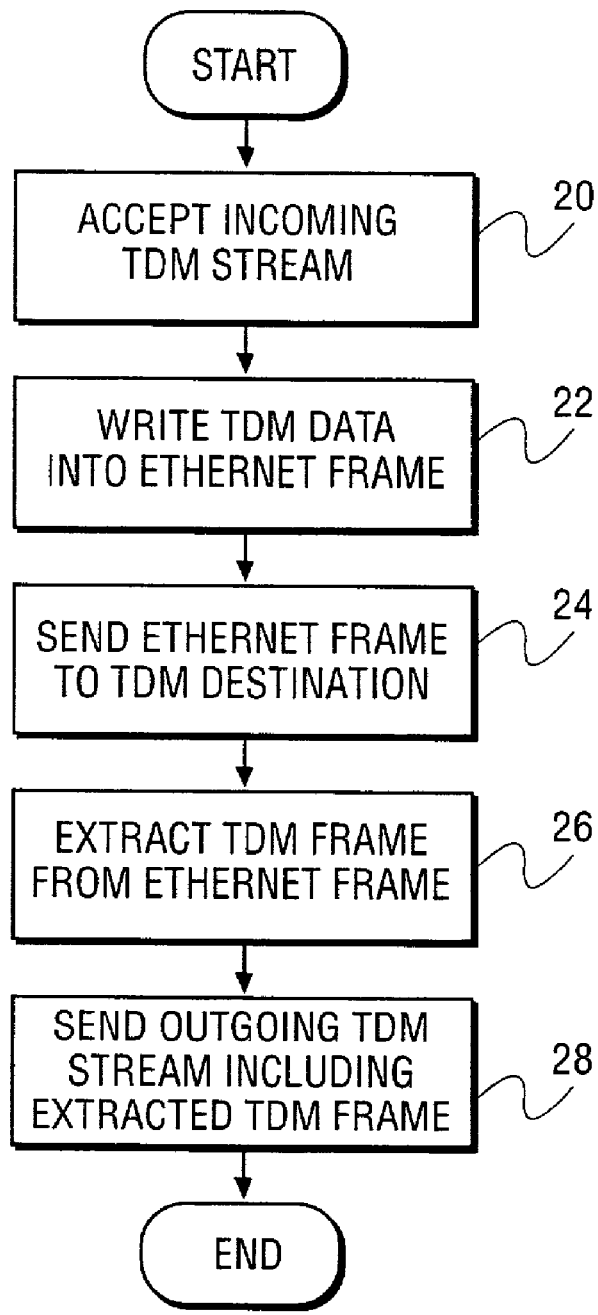
FIG. 2 is a flow chart of a method of writing a TDM data stream into Ethernet frames.

Turning now to FIG. 2, an embodiment of the present invention is shown in which TDM data is handled by a switch with an Ethernet backplane. The method begins with accepting an incoming TDM stream 20 into the switch, and the TDM stream includes TDM data frames. The TDM data is written into an Ethernet frame 22 and sent to a destination of the TDM frame 24. Once the TDM frame reaches its destination, the TDM frame is extracted from the Ethernet frame 26 and included in an outgoing TDM stream 28.

Figure 3:
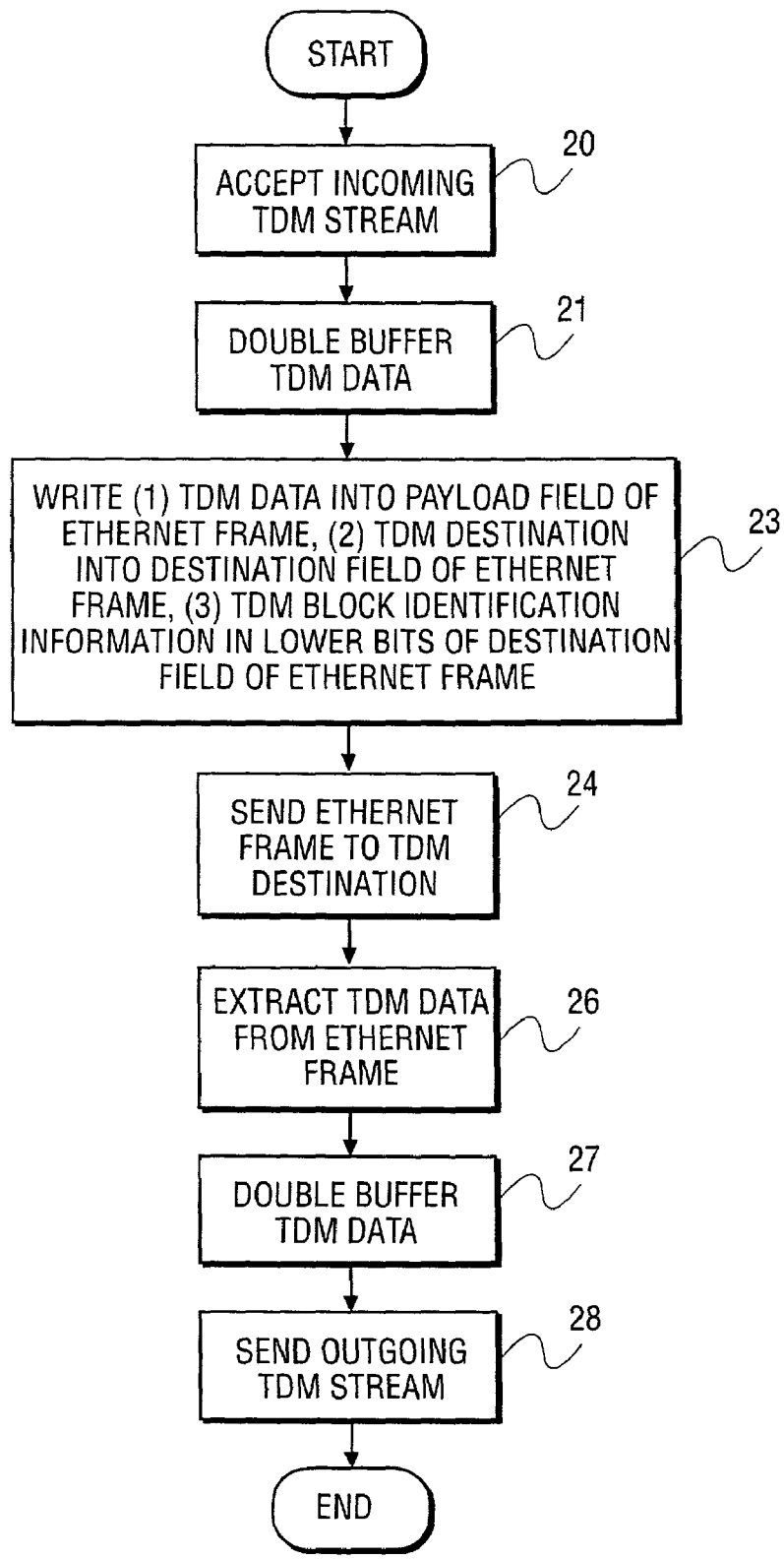
FIG. 3 is a flow chart of another method of writing a TDM data stream into Ethernet frames.

FIG. 3 shows an embodiment similar to the embodiment shown in FIG. 2. In addition to steps 20, 22, 24, 26, and 28, the embodiment of FIG. 3 includes double buffering the TDM data 21 before writing the TDM data into the Ethernet frame 23 and double buffering the extracted TDM data 27 before including the TDM data in an outgoing TDM stream 28. Although double buffering is shown both before and after transport of the Ethernet frame, it is within the contemplation of the present invention to double buffer only once, either before or after sending the Ethernet frame.

Figure 7:
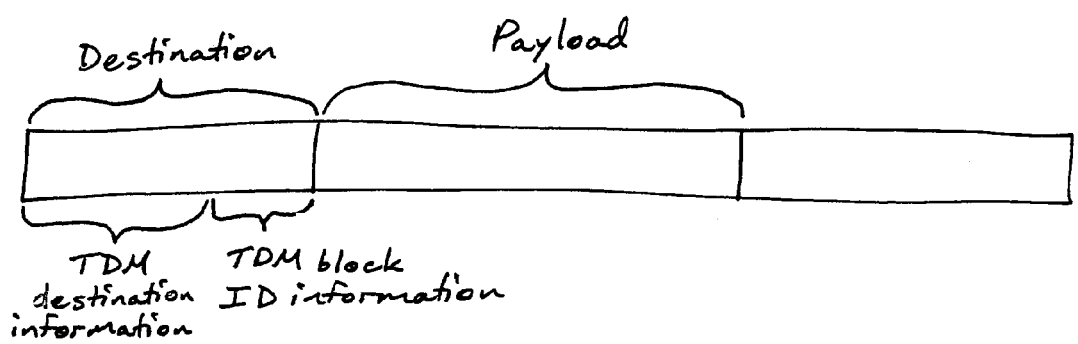
FIG. 7 is an embodiment of an Ethernet packet containing TDM block identification information in the lower bits of the destination field.

As mentioned in reference to FIG. 1, an embodiment could also include writing destination information and identifying information pertaining to the TDM data into one field in the Ethernet frame and writing TDM data into another field in the Ethernet frame. Specifically, FIG. 3 shows writing the TDM data into the Ethernet frame 23, which includes writing TDM data into the payload field of the Ethernet frame, writing the TDM destination into the Ethernet destination field, and writing TDM block identification information in the lower bits of the destination field of the Ethernet frame (FIG. 7). Although the TDM data is shown as being written to specific fields in the Ethernet frame, it is also contemplated that the TDM data may be written elsewhere or in a different arrangement.

Figure 4:
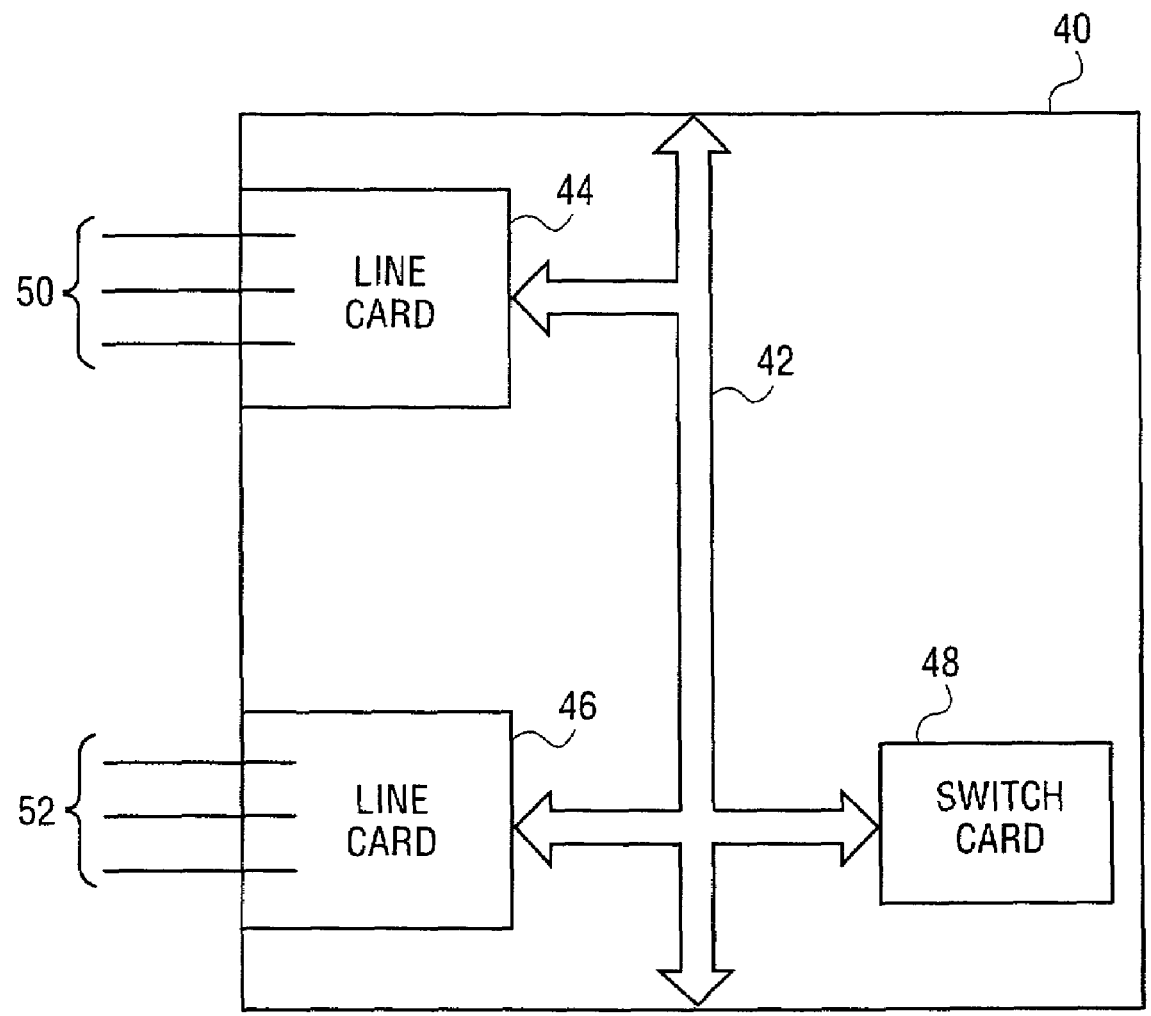
FIG. 4 is a diagram of a switch capable of writing a TDM data stream into Ethernet frames.

FIG. 4 shows a switch 40 in accordance with the present invention. The switch 40 shown has certain components omitted so as not to obscure the invention. The switch 40 has a bus 42 which connects line card 44, line card 46, and a switch card 48. As a TDM data stream enters the switch 40 via one of the lines 50, the line card 44 to which the line 50 is attached has circuitry (not shown) to write the TDM data frames into Ethernet frames. The line card circuitry sends the Ethernet frames to a destination of the TDM frames. In one instance, the destination could be another line card 46 in the switch 40. In which case, the Ethernet frame would be sent over the bus 42, through switch card 48 and to the appropriate line card 46. However, the destination may be the same line card 44 which received the TDM stream. Thus, the bus 42 and switch card 48 would not be utilized in that instance.

Figure 5:
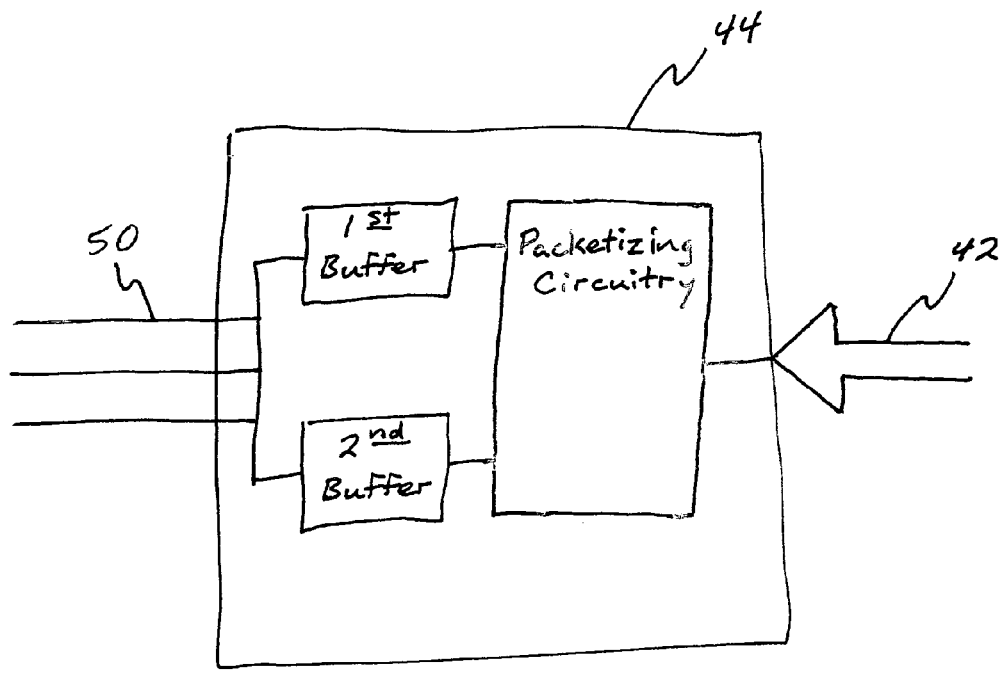
FIG. 5 is a block diagram of the line card of FIG. 4 containing first and second buffers to double buffer incoming and outgoing data.
Figure 6:
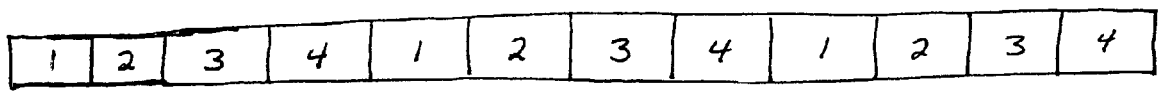
FIG. 6 is an embodiment of a TDM stream combining data from four different data streams into a single data stream.

Similar to FIGS. 1–3, the switch 40 could include buffers in the line cards 44–46 to double buffer incoming and/or outgoing TDM data streams (FIG. 5). In addition, the line cards 44–46 could include circuitry to write destination information and identifying information pertaining to the TDM data into one field in the Ethernet frame and TDM data into another field in the Ethernet frame.

It is to be understood that even though numerous characteristics and advantages of various embodiments of the present invention have been set forth in the foregoing description, together with details of the structure and function of various embodiment of the invention, this disclosure is illustrative only. Changes may be made in detail, especially matters of structure and management of parts, without departing from the scope of the present invention as expressed by the broad general meaning of the terms of the appended claims.

I claim:

1. A method, comprising packetizing, in a switch having an Ethernet backplane, a TDM frame from an inbound TDM data stream as an Ethernet packet by writing the TDM frame into a payload field of the Ethernet packet and writing (1) a destination of the TDM frame, and (2) information identifying which block of the TDM stream the TDM frame written into the payload field originated from into a destination field of the Ethernet packet.

* * * * *